Patented Jan. 25, 1944

2,340,271

UNITED STATES PATENT OFFICE 2,340,271

ALKANEDIONE DIOXIMES

Samuel B. Lippincott, Terre Haute, Ind., assignor to Commercial Solvents Corporation, Terre Haute, Ind., a corporation of Maryland No Drawing. Original application July 8, 1940, Serial No. 344,371. Divided and this application April 25, 1941, Serial No. 390,335

4 Claims. (Cl. 260—566)

My invention relates to new and useful compositions of matter. More particularly, it relates to dioximes having the following structural formula:

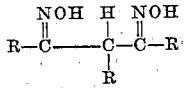

wherein R represents a low molecular alkyl group. These compounds are white crystalline substances which may be purified easily by recrystallization from methanol or other suitable solvents. As may be observed from the above structural formula, the compounds of my invention have two reactive groups and, as a result, are useful as intermediates for the synthesis of numerous organic compounds. These compounds are especially useful in the preparation of the corresponding isoxazoles, by either acid or alkaline hydrolysis thereof, as described in my U. S. Patent 2,260,256 of October 21, 1941.

Formation of the dioximes of my invention from nitroparaffins, is believed to proceed in accordance with the following equation, although the exact mechanism of the reaction is not known:

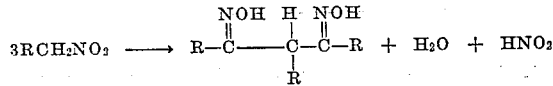

The production of such dioximes may be effected by maintaining the reaction temperature at a level sufficiently low to prevent substantial hydrolysis of the dioximes to the corresponding isoxazoles. Since I have found that the presence of strong alkalies tends to favor formation of isoxazoles even when employing relatively low temperatures I prefer to utilize weaker alkaline condensation agents such as, for example, ammonia bases. The term "ammonia base" as used herein is intended to be construed as signifying ammonia and compounds in which one or more hydrogen atoms of ammonia may be substituted by neutral or basic aliphatic groups. Alkyl amines such as ethyl amine, diethyl amine, triethyl amine, propyl amines, butyl amines, and the like, are very satisfactory for this purpose. It is to be understood, however, that the alkyl amines are merely preferred alkaline condensation agents, and that other bases of equivalent alkalinity may be employed with similar success. The amount of alkaline condensation agent to be employed may vary within relatively wide limits. There is reason to believe that the mechanism of this reaction involves the neutralization of one mole of nitric acid per mole of dioxime formed. For this reason it is desirable to employ at least one-third equivalent of alkaline material per mole of nitroparaffins. An excess of a relatively weak base is not detrimental and, in general, I prefer to employ at least one mole of an alkyl amine, or equivalent, alkaline converting agent per mole of nitroparaffin.

The production of the dioximes is preferably effected in a solvent medium which is a common solvent for the nitroparaffins and alkali, or the resulting nitroparaffin salt, and in which the dioxime is relatively insoluble. Water constitutes a very satisfactory solvent medium, especially, for the production of dioximes from the lower nitroparaffins. It is obvious, however, that other solvents having the above characteristics may be used in place of water. The amount of solvent to be employed is not critical. For instance, I have effected the reaction in the absence of any solvent and in the presence of water in amounts varying from ¼ mole of water per mole of nitroparaffin to 50 moles of water per mole of nitroparaffin, obtaining dioximes in all cases. I prefer, however, to employ from 0.25 to 5.0 moles of water per mole of nitroparaffin in most instances.

The production of the dioximes should be effected at relatively low temperatures, i. e., below 50° C. and preferably at temperatures of —10° C. to +30° C. Low temperatures tend to prevent the hydrolysis of the dioxime, especially in the case of the lower molecular weight nitroparaffins. When reacting low molecular weight nitroparaffins and especially nitroethane, I prefer to employ temperatures below ordinary room temperatures. The reaction temperature should be maintained sufficiently low to prevent the formation of hydrolytic products, i. e., isoxazoles, but sufficiently high to secure a reasonable reaction rate of formation of the crystalline dioximes. Obviously, however, unduly low temperatures result in reaction rates so low as to be undesirable from a commercial point of view.

The reaction may be effected simply by mixing the nitroparaffins and alkaline converting agents with or without a solvent, and allowing the mixture to stand at reaction temperature until the reaction is complete as evidenced by the discontinuation of the formation of a crystalline precipitate. The reaction can, however, be initiated at a somewhat higher temperature than the desired reaction temperature and then cooled to reaction temperature for the completion of the reaction. Thus, I have allowed reaction mixtures of this type to stand at room temperature for an initial period and then completed the reaction at approximately 0° C.

Any of the primary nitroparaffins which contain more than one carbon atom may be transformed into dioximes by my process.

The following examples to which, however, the present invention is not limited, are illustrative:

Example I

Nitroethane, diethyl amine, and water were mixed in a ratio of one mole of nitroethane, one mole of diethyl amine, and one-fourth mole of water, and the mixture was allowed to stand at 0° C. Crystallization of the dioxime was initiated by seeding and, at the conclusion of crystal formation, the crystals were separated by filtration and purified by successive recrystallizations from methanol. The product thus obtained constituted 3-methyl-2,4-pentanedione dioxime (melting point 132.2° C.; nitrogen content 19.64%; theoretical nitrogen content 19.44%). This product was also obtained utilizing n-propylamine as the alkaline condensation agent, and the two products were found to be identical by determining the melting point of a mixture of the products.

Example II

A mixture of 1-nitropropane, n-propylamine, and water, in a ratio of one mole of nitropropane, one mole of n-propylamine, and one-fourth mole of water, was prepared and allowed to stand at room temperature. Crystallization ensued without seeding, and at the conclusion of crystal growth, the mixture was cooled to 0° C. and filtered. The resultant crystalline product was washed with water and the wash water added to the mother liquor, the resulting mixture being cooled to 0° C. to secure a second crop of crystals. The product, 4-ethyl-3,5-heptanedione dioxime, was obtained in a yield of 58% of the theoretical amount. After purification by recrystallization from methanol, the product was found to have a melting point of 135.4° C. This compound was also prepared by the use of ammonia, n-butylamine, and 2-aminoheptane, as the alkaline condensation agent, and, in each case, was found by the determination of a mixed melting point to be identical with the above product. The above compound was analyzed and found to have a nitrogen content of 15.19% as compared to 15.05% for theory.

Example III

A mixture of 1-nitrobutane, n-butylamine, and water, in the proportions of one mole of 1-nitrobutane, one mole of n-butylamine, and one-fourth mole of water, was allowed to stand at room temperature. Crystal formation occurred without seeding and, at the conclusion thereof, the mixture was cooled to 0° C. and allowed to stand at this temperature until no additional crystal growth could be observed. The product was recovered by means of filtration and the mother liquor was again cooled to 0° C. to obtain a second crop of crystals. The product, 5-propyl-4,6-nonanedione dioxime, was obtained in a yield of 37% of the theoretical amount. After recrystallization from methanol, this compound was found to have a melting point of 116.4–116.8° C. and a nitrogen content of 12.19% (theoretical 12.27%).

It is to be understood, of course, that the above examples are merely illustrative and do not limit the scope of my invention in any manner. On the contrary, the present invention is generally applicable to the production of dioximes from any of the primary nitroparaffins (1-nitroalkanes) containing more than one carbon atom. As has previously been pointed out, other alkaline condensation agents might be employed in place of the specific amines employed in the examples, and the reaction conditions utilized in the examples can be varied in numerous respects with substantially the same results. In general, it may be said that the use of any equivalents or modifications of procedure which would naturally occur to those skilled in the art, is included within the scope of my invention.

This is a division of my co-pending application, U. S. Serial No. 344,371, filed July 8, 1940.

My invention now having been described, what I claim is:

1. A dioxime having the formula:

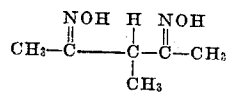

2. A dioxime having the formula:

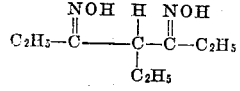

3. A dioxime having the formula:

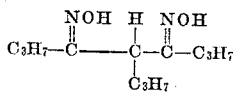

4. Symmetrical dioximes having the structural formula:

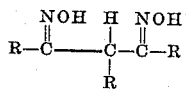

wherein R is a low molecular alkyl group, said dioximes being white crystalline substances which can be purified easily by recrystallization from methanol.

SAMUEL B. LIPPINCOTT.

CERTIFICATE OF CORRECTION.

Patent No. 2,340,271. January 25, 1944.

SAMUEL B. LIPPINCOTT.

It is hereby certified that error appears in the printed specification of the above numbered patent requiring correction as follows: Page 1, first column, line 29, for that portion of the formula reading "$HNO_2$" read --$HNO_3$--; and that the said Letters Patent should be read with this correction therein that the same may conform to the record of the case in the Patent Office.

Signed and sealed this 23rd day of May, A. D. 1944.

Leslie Frazer

(Seal)                      Acting Commissioner of Patents.